May 21, 1940.　　　　　L. C. DOANE　　　　　2,201,856
VEHICLE LIGHTING EQUIPMENT
Filed Aug. 31, 1937　　　2 Sheets-Sheet 1
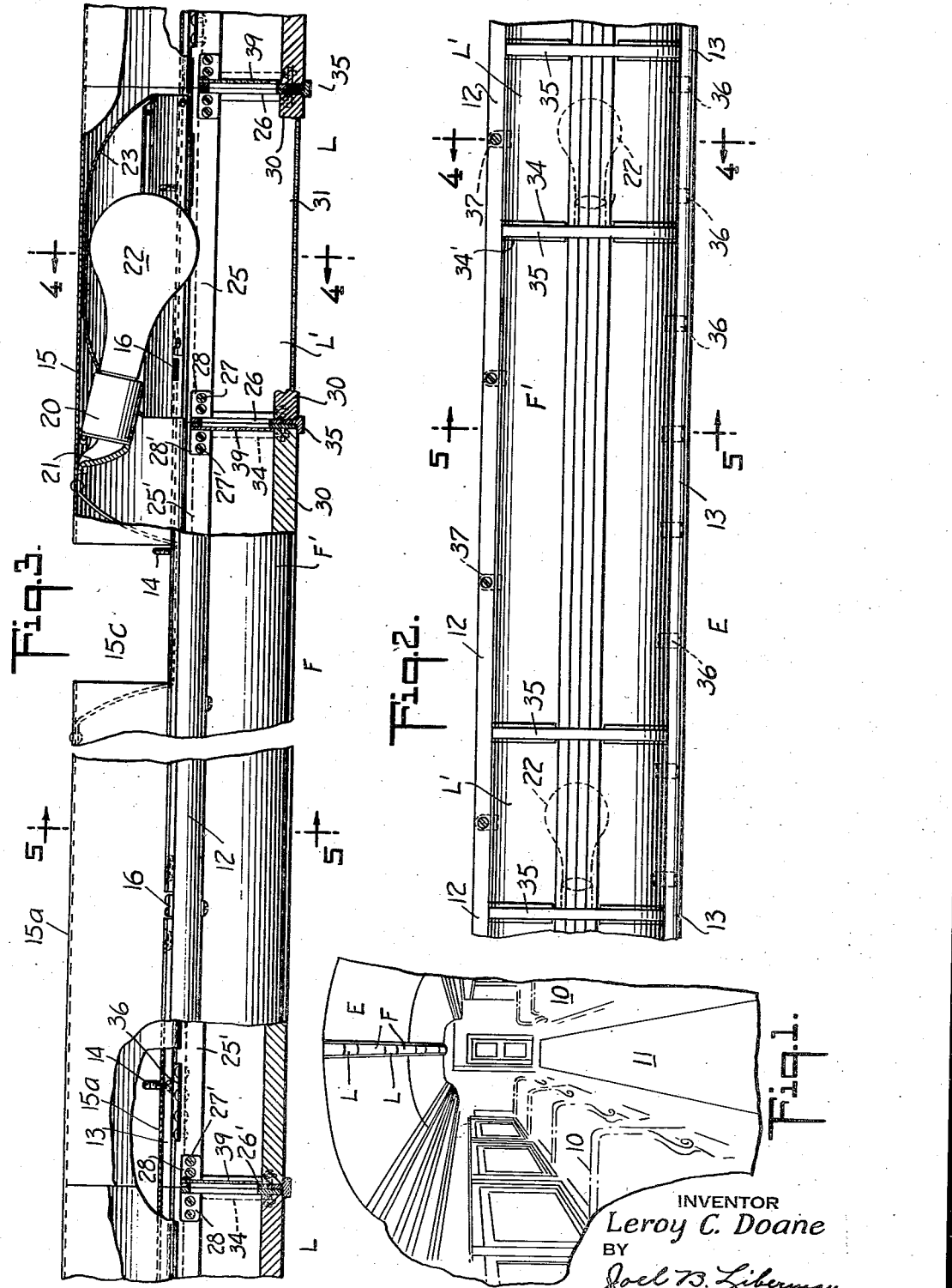
INVENTOR
Leroy C. Doane
BY
Joel B. Lieberman
ATTORNEY

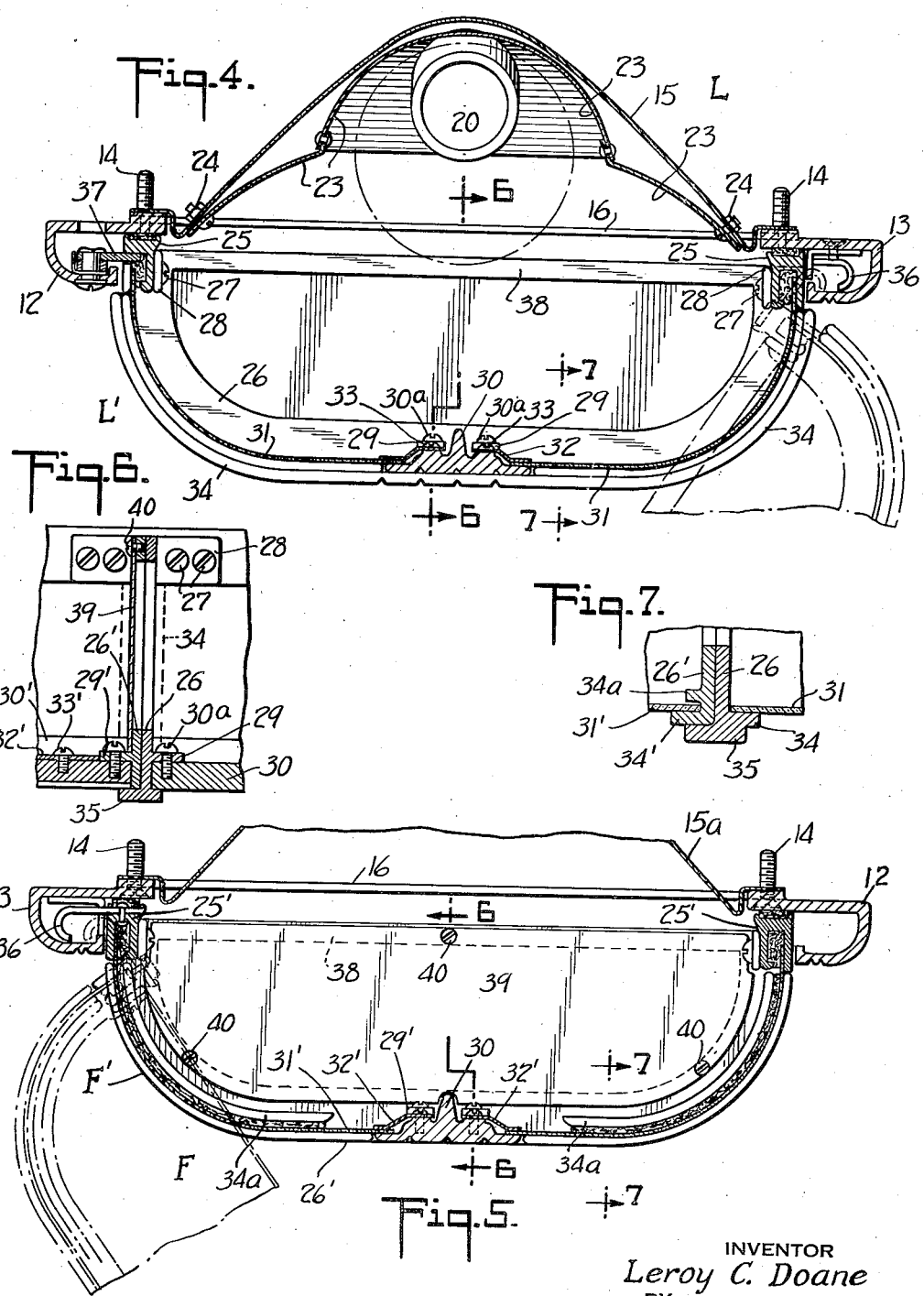

Patented May 21, 1940

2,201,856

UNITED STATES PATENT OFFICE 2,201,856

VEHICLE LIGHTING EQUIPMENT

Leroy C. Doane, Meriden, Conn., assignor to The Miller Company, Meriden, Conn., a corporation of Connecticut Application August 31, 1937, Serial No. 161,769

8 Claims. (Cl. 240—7.35)

The present invention relates to vehicle lighting equipment, and is more particularly directed toward lighting equipment designed for use in railway coaches.

The present invention contemplates railway coach lighting equipment adapted for mounting in the ceiling of the coach over the aisle, a part of the equipment being recessed into the ceiling and a part projecting below the ceiling.

According to the present invention the visible part of this lighting equipment has a uniform cross section which extends the entire length of the car, so that the lighting apparatus presents a long streamlined appearance.

The present invention contemplates car lighting equipment having alternate units each provided with a light source, a reflector, and a light transmitting closure adapted to permit distribution of light across the car, so as to build up the illumination in the region of the working plane over the seats, and these alternate lighting units are separated by filler units provided with translucent material adapted to be rendered luminous by spilt or stray light from the lighting units. In this way the entire length of the car is provided with a luminous centrally disposed strip in the ceiling and effective distribution of light in the working area is obtained.

A further object of the invention is to provide an arrangement of alternate lighted and filler units with closure members, each of which is adapted for easy removal for cleaning and lamp renewals.

Other and further objects of the invention will appear as the description proceeds.

The accompanying drawings show, for purposes of illustrating the present invention, one of the many embodiments in which the invention may take form, it being understood that the drawings are illustrative of the invention rather than limiting the same.

In these drawings:

Figure 1 is a perspective view through a car interior illustrating the location of the lighting equipment;

Figure 2 is an inverted plan view of the lighting equipment;

Figure 3 is a longitudinal sectional view, parts being in elevation and parts broken away;

Figure 4 is a vertical sectional view on the line 4—4 of Figures 2 and 3, illustrating a lighting unit;

Figure 5 is a vertical sectional view on the line 5—5 of Figures 2 and 3, illustrating a filler unit;

Figure 6 is an enlarged sectional view on the broken line 6—6 of Figures 4 and 5; and Figure 7 is an enlarged sectional view taken on the line 7—7 of Figures 4 and 5.

Figure 1 shows a typical car interior having rows of seats 10 separated by an aisle 11. The lighting equipment is indicated at E. It is placed in the ceiling of the car over the aisle. This lighting equipment comprises a plurality of alternate lighting units indicated generally at L, and filler units indicated at F the latter being somewhat longer than the lighting units.

Side members 12 and 13 are suitably secured to the roof structure of the car by screws indicated at 14. These members preferably are of the channel shaped cross section, indicated in Figures 4 and 5, and may be made up in suitable lengths for convenient handling. These lengths may be either the length of a filler unit, or of a lighting unit, or any convenient length whereby two or more adjacent units may be connected to integral side members.

The entire length of the lighting equipment is provided with an inverted trough, indicated at 15, 15a. This trough may be interrupted, as indicated at 15c, to accommodate structures of the car, such as a carline. The lighting equipment structure may be re-enforced by transversely extending straps, indicated at 16.

A lamp socket, such as indicated at 20, is carried from the socket support 21 secured to the trough 15. The socket carries a lamp bulb 22, which is disposed below an inverted trough-shaped reflector 23. The reflector has downwardly curving end portions as indicated to limit the longitudinal spread of the reflected light, and is secured to the trough by bolts, indicated at 24.

The space below the fixed side members 12 and 13 is closed in by hinged closures L' and F'. These closures are made generally the same. The closure L' for the lighting unit L has upper side frame members 25, 25 of inverted channel shaped cross section, as shown in Figure 4. These side frame members are connected together by U-shaped end frame members 26, the connection being made by screws 27 passing through lugs 28. The central bottom portions of the end frame members 26 carry laterally extending lugs 29 to which a molding 30 is secured by screws 30ª.

The top side frame members, the end frame members and the central molding form two rectangular shaped openings, each of which is closed by a sheet of translucent material, indicated at 31. This may be of non-frangible synthetic material or glass. This sheet of translucent material enters the channel in the member 25, as indicated, and is held in place by clips 32 secured to the central molding by screws, indicated at 33.

The end frame members 26 have lips or ledges 34 against which the ends of the translucent material bear. The peripheral portions of the end frame members 26 are provided with ornamental T-shaped heads 35 made left and right as shown in Fig. 3 to insure closing the gap between the lighting units and the filler units and to permit opening any lighting unit desired. One of the side frame members 25 is secured to hinge elements 36, while the other side frame member co-operates with a locking key 37. The closure member may be locked in the full line position of Fig. 4, or released and swung downwardly, as shown in dot-and-dash lines.

The closure units F' for the fillers are substantially the same, except for length, as the closures for the lighting units, except that the end frame members 26' are cut back to fit inside the head 35, as shown in Figures 6 and 7. Other parts of the closure member for the filler units are indicated by the same reference characters with a prime added. The ends of the translucent material 31' of the filler units extend under lips 34ª as indicated in Figs. 5 and 7. The end frame members 26 and 26' are each preferably provided with a cross bar 38 at the top, as indicated in Figures 4 and 5. This stiffens the construction and affords a support for a sheet of translucent material 39, which is secured to the end frame members of either the filler unit or the lighting unit. Figure 5 shows the sheet 39 secured to the end frame members 26' by screws 40. The filler unit is secured in place by hinges indicated at 36 and catches for locking keys 37.

It will be noted that the alternate arrangement of lighting units and filler units makes it possible to provide a strip running the entire length of the car, which appears luminous when the lamps are lighted, and at the same time to have the lighting units spaced the same as the seat spacing, so that the illumination is accomplished by having the reflector trough shaped so as to achieve the desired spread in transverse planes, and this spread is not substantially altered by the translucent material employed, this material being slightly diffusing, so as to directionally transmit most of the light rays while concealing interior constructions. Some of the light which is not used for the direct lighting of the working area is spilled longitudinally of the trough and passes into the region above the closures F', rendering the same luminous. The screen 39 prevents direct rays from falling on the closure F' and avoids bright spots in the same.

It is obvious that the invention may be embodied in many forms and constructions within the scope of the claims and I wish it to be understood that the particular form shown is but one of the many forms. Various modifications and changes being possible, I do not otherwise limit myself in any way with respect thereto.

What is claimed is:

1. Means for lighting a vehicle having a ceiling and rows of seats separated by an aisle, comprising a plurality of regularly spaced lighting units supported by the ceiling over the aisle, each unit having a light source, a reflector above the source for projecting the rays downwardly in a widely divergent beam, and a diffusing closure below the reflector, the units having light transmitting ends to permit the escape of light rays longitudinally, a plurality of filler units intermediate the closure portion of the lighting units, the filler units receiving said escaping light rays and having a light diffusing closure rendered luminous thereby, and diffusing screens in the path of said escaping light rays to prevent direct rays from falling on the closures of the filler units.

2. Vehicle lighting means such as claimed in claim 1, wherein the closures for the lighting units and the filler units are each of rectangular configuration in horizontal planes.

3. Vehicle lighting means such as claimed in claim 1, wherein the closures for the lighting units and the filler units are of uniform cross section in vertical planes.

4. Vehicle lighting equipment comprising longitudinally extending, spaced parallel, ceiling supported members, inverted reflectors carried at spaced intervals by the members, light sources below the reflectors, downwardly removable light transmitting closures disposed below the reflectors and carried by the members, the sides of the closures extending up to the said members, the closures having light transmitting ends to permit escape of light rays longitudinally, downwardly removable filler units disposed between said closures and supported from the longitudinally extending members, the filler units receiving said escaping light rays and having a light diffusing closure rendered luminous thereby, and diffusing screens in the path of said escaping light rays to prevent direct rays from falling on the closures of the filler units.

5. Vehicle lighting equipment such as claimed in claim 4, wherein each closure includes side frame members adjacent the ceiling supported members, end frame members depending below the side frame members, and supporting the light diffusing material.

6. A lighting fixture comprising a light source, a reflector about the source for directing rays downwardly, and a rectangular closure for the mouth of the reflector comprising side frame members of inverted channel cross section, U-shaped end frame members having inwardly extending lips adjacent their edges, a centrally disposed bottom frame member interconnecting the end frame members, clamping strips carried by the bottom frame member, and panels of translucent material whose longitudinal edges are received within the respective channels and under the strips and whose side edges bear on the lips.

7. A lighting fixture such as claimed in claim 6, wherein the end frame members have cross straps at the top to form an opening and having sheets of translucent material across the openings in the end frame members.

8. Means for lighting a vehicle having a ceiling and rows of seats separated by an aisle, comprising a plurality of lighting units supported by the ceiling over the aisle and spaced the same as the seats, each unit having a light source, a recessed reflector above the source with ends which limit the longitudinal spread of reflected light and a transverse profile to project the rays downwardly in a beam widely divergent in directions transverse of the car aisle, and a slightly diffusing closure below the reflector and ceiling for concealing the source and reflector without substantially interfering with the direction of the dominant direct and reflected light, the units having light transmitting ends to permit the escape of light rays longitudinally, and a plurality of filler units intermediate the closure portion of the lighting units, the filler units being substantially longer than the lighting units, receiving said escaping light rays, and having a light diffusing closure rendered luminous thereby.

LEROY C. DOANE.